United States Patent [19]

Muschelknautz et al.

[11] Patent Number: 5,266,753
[45] Date of Patent: Nov. 30, 1993

[54] MUFFLER FOR A FAN, PARTICULARLY FOR AN INTERNAL COMBUSTION ENGINE

[75] Inventors: Claudius Muschelknautz, Lauf, Fed. Rep. of Germany; Claude Bleger, Duttlenheim, France; Reuben Agnon, Sasbach, Fed. Rep. of Germany; Jochen Goehre, Karlsruhe; Gerhard Zink, Buehl, Fed. Rep. of Germany

[73] Assignee: Robert Bosch GmbH, Stuttgart, Fed. Rep. of Germany

[21] Appl. No.: 940,455

[22] Filed: Sep. 4, 1992

[30] Foreign Application Priority Data

Sep. 6, 1991 [DE] Fed. Rep. of Germany ....... 4129684
Feb. 22, 1992 [DE] Fed. Rep. of Germany ....... 4205489

[51] Int. Cl.$^5$ ............................................. E04F 17/04
[52] U.S. Cl. ..................................... 181/224; 181/225
[58] Field of Search ............... 181/202, 204, 205, 224, 181/225, 230, 238

[56] References Cited

U.S. PATENT DOCUMENTS

| | | | |
|---|---|---|---|
| 2,853,147 | 9/1958 | D'Eustachio | 181/224 |
| 3,540,547 | 11/1970 | Coward, Jr. | 181/224 |
| 4,174,020 | 11/1979 | Challis | 181/225 |
| 4,750,860 | 6/1988 | Kelley | 181/205 X |
| 4,807,718 | 2/1989 | Lotz | 181/202 |

Primary Examiner—Michael L. Gellner
Assistant Examiner—Khanh Dang
Attorney, Agent, or Firm—Michael J. Striker

[57] ABSTRACT

The muffler for a fan, especially a bypass air fan of an internal combustion engine, has a housing provided with an air outlet opening and an air inlet opening and including a housing pot having a top opening and a flat housing cover at least partially closing the top opening of the housing pot, the air inlet opening being coaxial to the housing axis and advantageously provided in the housing cover, and a damping insert made from a sound absorbing material and being provided with at least one helical or spiral air flow passage providing a connection between the air outlet opening and the air inlet opening so that air can flow through the air inlet opening to the air outlet opening. In one variation the air outlet opening can open radially from the housing pot and the air inlet opening can be provided centrally in a flat housing cover. In another variation the air outlet opening includes two throughgoing openings of approximately equal diameter provided in the housing cover and spaced an equal distance from the housing axis and the damping insert is made from a plurality of substantially equal disks stacked one on the other in the housing pot of the housing.

8 Claims, 4 Drawing Sheets

MUFFLER FOR A FAN, PARTICULARLY FOR AN INTERNAL COMBUSTION ENGINE

BACKGROUND OF THE INVENTION

The present invention relates to a muffler for a fan and, more particularly, to a muffler for a by-pass fan of an internal combustion engine with a regulated three-way catalytic converter.

A bypass air fan is used in an internal combustion engine with a regulated three-way catalytic converter to feed fresh air into the exhaust system of the internal combustion engine. Because of that an afterburning of the exhaust gas at temperatures above 600° C. occurs. During the afterburning the carbon monoxide and hydrocarbon content of the exhaust gas is reduced before the exhaust gas flows through the catalytic converter. Furthermore additional heat is supplied to the catalytic converter by the combustion process, which is especially advantageous for cold starts. However at the entrance of this type of bypass air fan considerable noise is generated in operation, which requires the use of a noise damping device, i.e. a so-called muffler, having a housing and an inlet and outlet opening.

SUMMARY OF THE INVENTION

It is an object of the present invention to provide a muffle for damping noise generated in operation of a bypass air fan of an internal combustion engine.

According to the invention, a muffler for a fan, especially a bypass fan of an internal combustion engine, includes an advantageously plastic housing having a housing axis, an air inlet opening and an air outlet opening connectable to an air intake side of the fan; and a damping insert advantageously made from a porous sound absorbing material and having at least one air flow passage providing a connection between the air outlet opening and the air inlet opening of the housing. The at least one air flow passage takes a course varying from a direct linear connection between the air outlet opening and the air inlet opening, particularly a spiral or helical path.

The muffler according to the invention has the advantage that the air inlet and outlet openings are not coaxial or do not lie on the same axis so that there is no direct path for sound waves to travel through the muffler and thus a damping of noise results. When a spiral or helical shape is used for the air passage through the muffler a longer path for the air flow in the sound absorbing material results. Thus inspite of a comparatively short length of the desirably compact muffler a good damping of generated noise results. The pressure drop occurring on passage of air through the muffler however is comparatively low.

Various embodiments of the invention are possible having a number of advantageous features.

In a particularly advantageous embodiment consists of a plurality of substantially equal disks stacked one on the other in the housing pot of the housing and each having two passage segments of equal diameter and spaced an equal distance from the housing axis. Each of the disks being rotated or staggered a predetermined angle relative to an adjacent disk so that the passage segments form two helical passages through the damping inserts connecting the air outlet opening with the air inlet opening. This has the advantage that the cross-section through the damping material is doubled and the pressure drop for the air flow is further reduced.

In a particularly preferred embodiment the housing includes a housing pot having a top opening and a funnel-like pot base, and a flat housing cover at least partially closing the top opening of the housing pot, the air inlet opening being coaxial to the housing axis and provided in the funnel-like pot base. The air outlet opening comprises two throughgoing openings of approximately equal diameter provided in the housing cover and spaced an equal distance from the housing axis, which correspond to the passage segments in the disk nearest the housing cover.

In another preferred embodiment of the invention a single spiral air flow passage coaxial to the housing axis is provided in the damping insert. The air inlet opening of the housing is coaxial to the housing axis and is provided in the housing cover which is flat and the air outlet opening is tangential or radial and is provided on a side or wall of the housing pot, which has a flat wall opposite the cover with the sound absorbing material extending between the flat wall and the cover as a spiral strip. This embodiment is economical to make and is particularly easy to construct.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE PREFERRED EMBODIMENT

Figure 1:
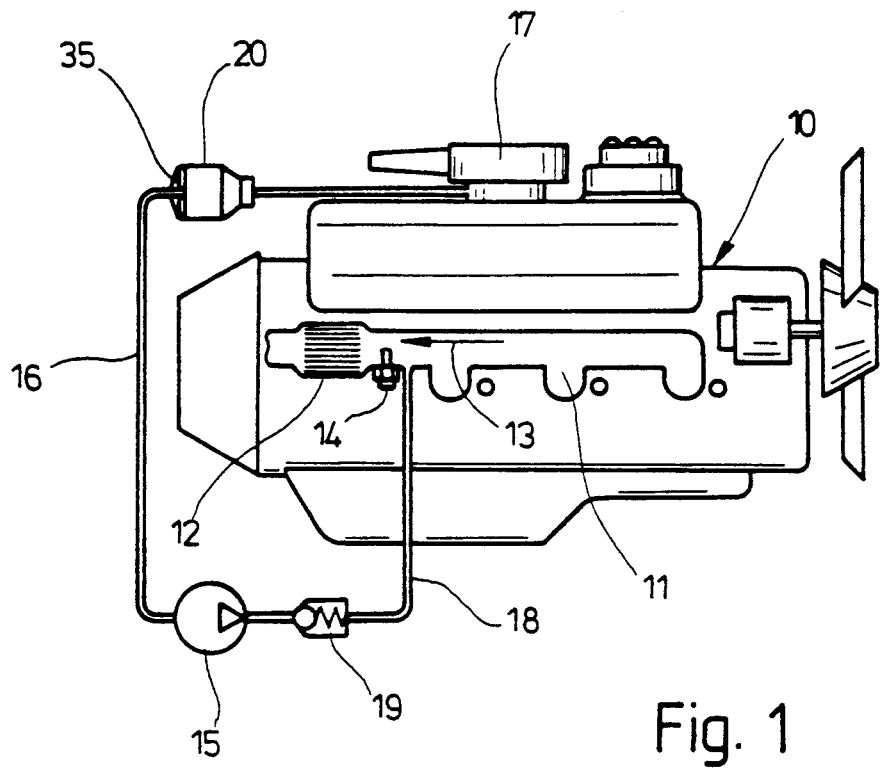
FIG. 1 is a side schematic view of an internal combustion engine with a regulated three-way catalytic converter, a bypass air fan and a muffler according to the invention connected to the bypass air fan on its intake side.

An internal combustion engine 10 for a motor vehicle shown in FIG. 1 has an exhaust gas manifold 11, in which there is a three-way catalytic converter 12. The exhaust gas flows in the direction shown by the arrow 13. A lambda probe 14 is located in the exhaust manifold 11 upstream of the catalytic converter 12. A bypass air fan 15 is connected to the outlet of the air filter 17 of the internal combustion engine 10 by a vacuum line 16. A pressure line 18 leads from the fan 20 to the exhaust gas manifold 12. It opens into the exhaust manifold 11 upstream of the catalytic converter 12. A nonreturn valve 19 is arranged in the pressure line 18, which prevents, when the fan is idle, exhaust gas from reaching the fresh air fed into the internal combustion engine 10 through the pressure line 18, the fan 15 and the vacuum line 16.

Figure 2:
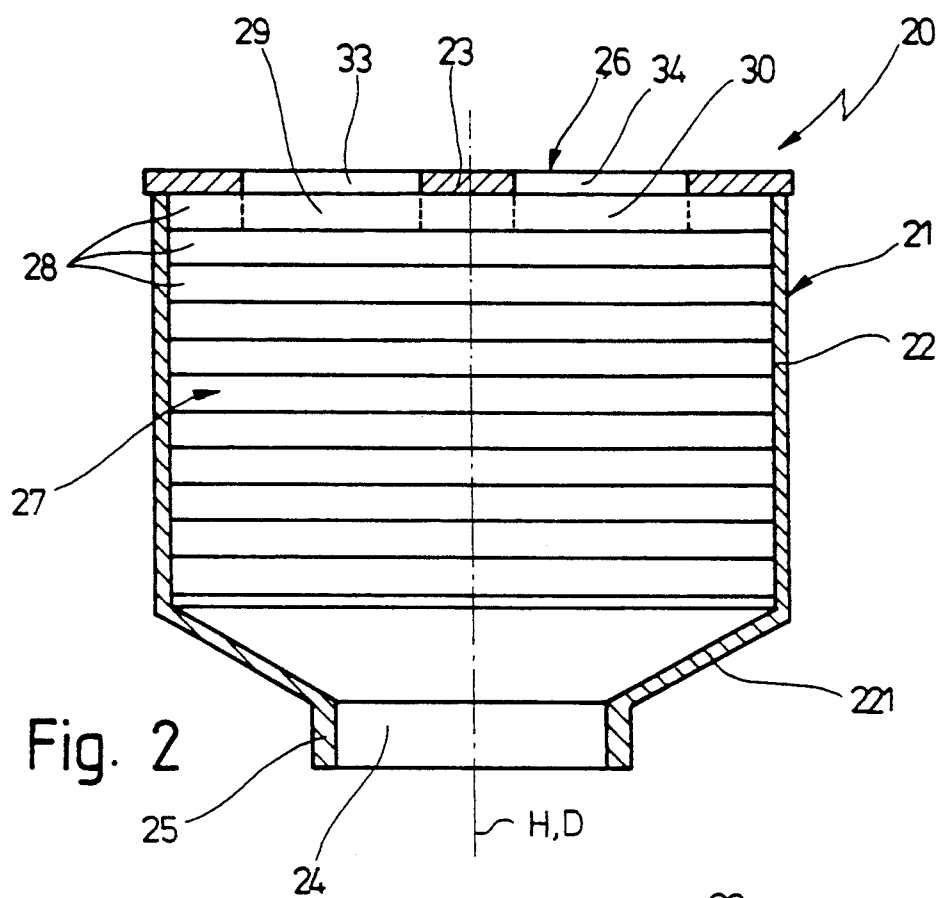
FIG. 2 is a longitudinal cross-sectional view through the muffler of FIG. 1.
Figure 3:
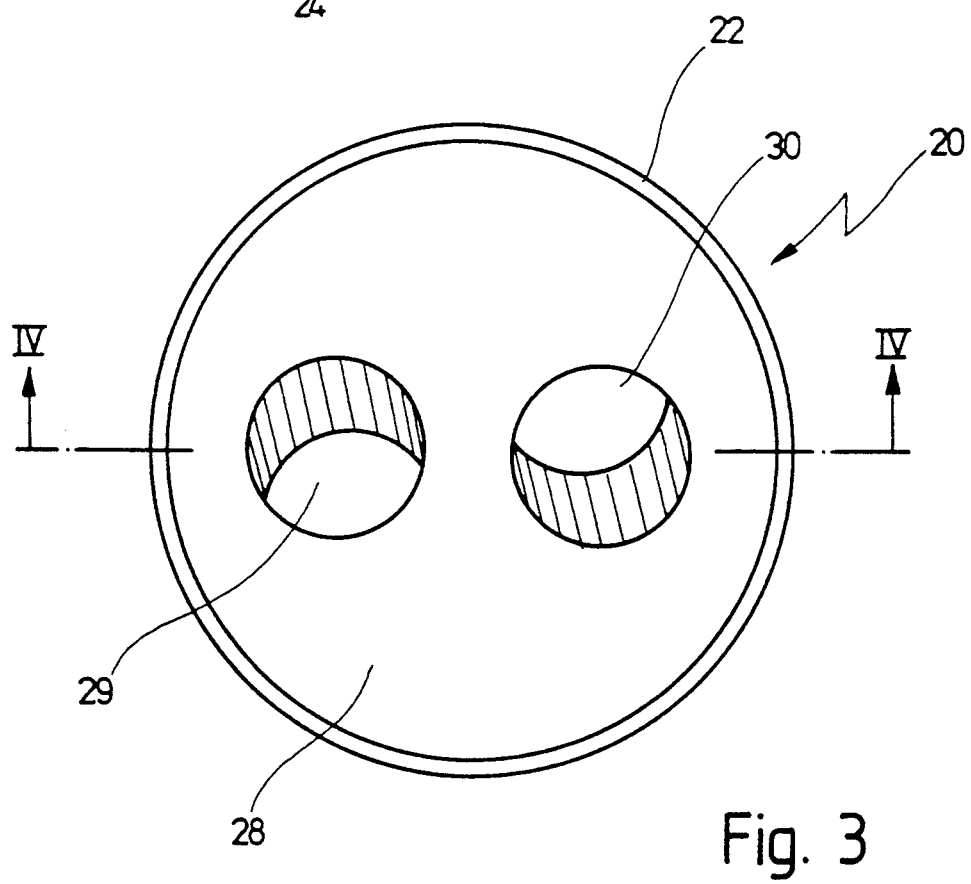
FIG. 3 is a top plan view of the muffler of FIG. 2 with the housing cover removed.

Since a comparatively large amount of noise is generated at the intake end of the fan, a muffler 20 is arranged in the vacuum line 16, which is structured so that it provides a good noise reduction with only minimal pressure drop in the air flow. The muffler 20 is illustrated in a longitudinal cross-section in FIG. 2 and in a top view in FIG. 3 with the housing opened. The two-piece housing 21 made from plastic comprises a housing pot 22 with a funnel-like pot base 221 and a flat housing cover 23, which closes the pot opening of the housing pot. The pot base 221 is provided with a central air opening 24, which completely takes up the reduced diameter front end of the pot base 221. The air inlet opening 24 is surrounded by a connector pipe 25, which is formed in one piece on the pot base 221. An air outlet opening 26, of which more details are to be described hereinbelow, is arranged in the housing cover 23. The air inlet opening 24 and the air outlet opening 26 could be exchanged with each other in other embodiments.

Figure 4:
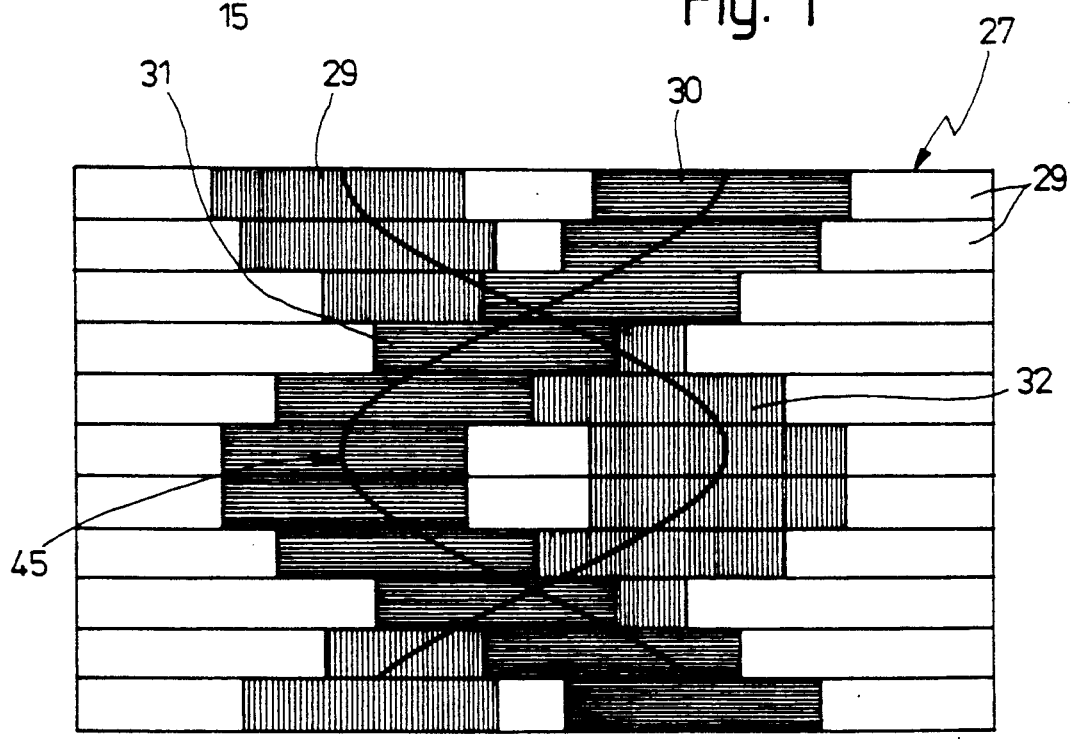
FIG. 4 is a schematic cross-sectional view through a damping insert in the muffler taken along the section line IV—IV of FIG. 3 for illustration of the method of making spiral passages in the damping insert.

A damping insert 27 made from porous sound absorbing material is inserted in the housing 21. It comprises disks 11, which are stacked one on top of the other axially in the housing 21 and which fill the entire cylindrical portion of the housing pot 22. Each disk 28 has two equal size passages 29,30, which are positioned on opposite sides of the disk axis diametrically opposed to each other and spaced approximately the same radial distance from the disk axis. All disks 28 are formed identically with passages 29 and 30. However on insertion of each disk 29 in the housing pot 22 it is rotated 33° about the housing axis relative to its neighboring disk. Because of that, two helical passages 31, 32 are formed in the damping insert 27, whose coil axes extend parallel to the housing axis and which coil in the same direction around their axes. These helical passages 31,32 are shown schematically in FIG. 4, which shows a cross-section of the sound damping insert 27 taken along the line IV—IV of FIG. 3. For clear indication the helical passages 31,32 are shown with different shading for emphasis. The nonshaded portion of the individual disks 28 are shown in contrast to the surfaces which have been exposed by the cutting required to produced the passages. The helical passages 31,32 open on one end with spacing in front of the air inlet opening 24 in the funnel-like pot base 221 of the housing pot 22 and on the other end in the air outlet opening housing 26, which is formed in the housing cover 23 by two throughgoing holes 33,34, which are congruent to the passage openings of the passages 29,30 in the topmost disk 28 bounding the housing cover 23. For connection of the section of the vacuum line 16 found between the muffler 20 and the fan 15 to the vacuum line 16 either a funnel-like inverted connection cap 35(FIG. 1) with a central connector is connected over the housing cover 23 or the sound damping end of this vacuum line section is divided into two branches, which are each fed through one of the throughgoing holes 33,34. Because of the spiral shape of these passages 31,32 a comparatively long path length for the blower air results between the air outlet opening 26 and the air inlet opening 24 of the housing 21 while avoiding a direct connection between them, which results in a comparatively smaller axial structure for the muffler 20. The air flow through the free space present in the pot base 221 between the air inlet opening 24 and the sound absorbing insert 27 and thus reduces the pressure drop. When a comparatively small fan output is required instead of two spiral passages 31,32 a single helical passage results so that the housing diameter can be reduced. With higher fan output however both spiral passages 31,32 are of advantage so that the pressure drop in the muffler 20 is kept at a minimum.

Figure 5:
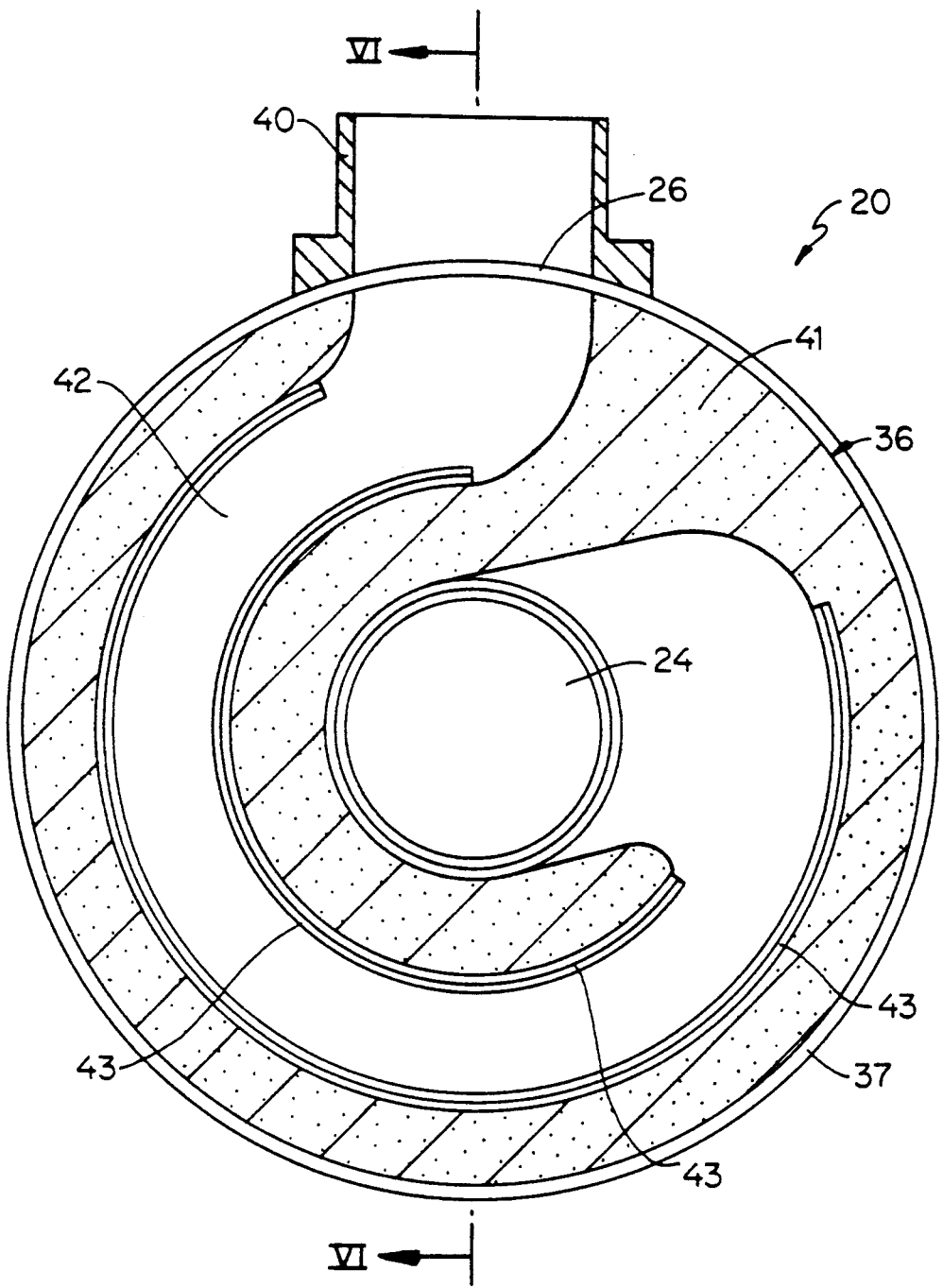
FIG. 5 is a cross-sectional view through another embodiment of a muffler according to the invention taken along the section line V—V of FIG. 6.
Figure 6:
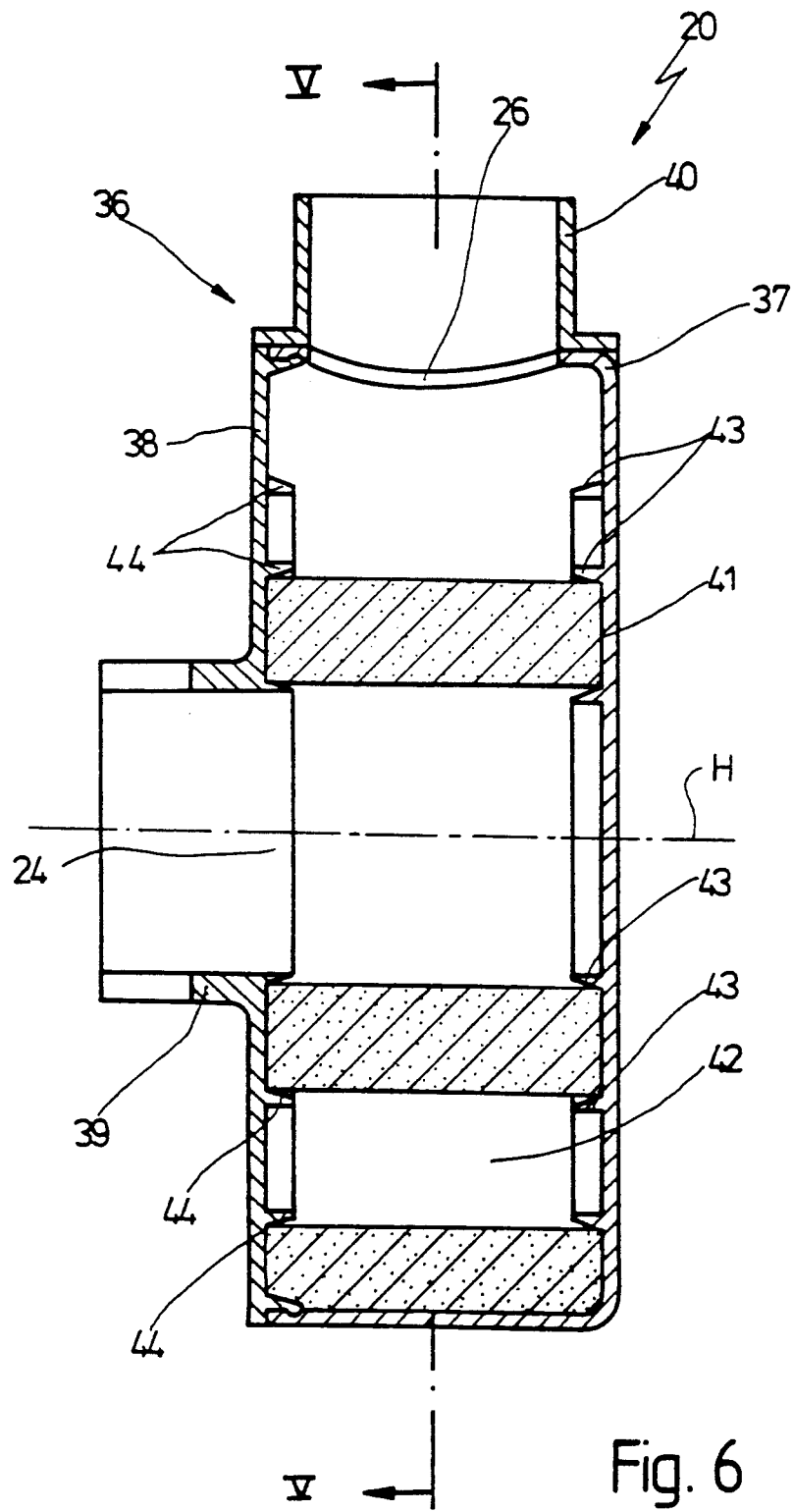
FIG. 6 is a cross-sectional view through the muffler shown in FIG. 5 taken along the section line VI—VI of FIG. 5.

In FIGS. 5 and 6 another embodiment of a muffler 20 is shown instead of the muffler 20 in the vacuum line 16. The muffler 20 of FIG. 5 has a two-part housing 36 made from plastic, which comprises a housing pot 37 with a flat pot base and a housing cover 38 closing the pot opening. The air inlet opening 26 is accomplished by a central passage in the housing cover 38 to a radial passage in the housing pot wall and the air outlet opening 24. Both the air outlet opening 26 and the air inlet opening 24 is surrounded by a connector pipe 40 and/or 29, which is spaced radially from the housing pot wall and/or axially from the housing cover 38. Also the air inlet opening 24 and the air outlet opening 26 could be exchanged with each other in a different arrangement.

The damping insert 41 made from an open and porous sound absorbing material is received in the housing pot 37, in which an air flow path 42 connecting the air inlet opening 24 with the air outlet opening 26 is formed. This air flow path 42 is spiral shaped and coaxial to the housing axis. In the axial direction of the housing 36 the flow path 42 extends from the pot base to the housing cover 38 and is bounded by both in the axial direction. The spiral absorbing insert 41 is fixed between axially projecting pieces 43 and/or 44 in the interior of the housing pot 37, which are formed at one end on the inner wall of the housing cover 38 and at the other end on the pot base. The passage of sound directly through the damping insert 41 and the muffler 20 is prevented by the spiral shape of the flow path 42 and the path of the air remains large, whereby a very good damping of the sound occurs. In contrast to the muffler show in FIGS. 2 and 3 the muffler 20 shown in FIGS. 5 and 6 has a damping insert which is comparatively easy to construct, since a material strip need only be laid between the preformed projecting pieces 43,44.

The application of the muffler according to the invention are not limited to the bypass air fan for an internal combustion engine. It can be used with almost any of the kind of fan, particularly those used in a motor vehicle.

While the invention has been illustrated and described in muffler for a fan, particularly a bypass for an internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is desired to be protected by Letters Patent is set forth in the appended claims.

We claim:

1. A muffler for a fan, said muffler comprising a housing (21) having a housing axis and provided with an air inlet opening (24) and an air outlet opening (26) connectable to an air intake side of a fan (15); and a damping insert (27) provided with at least one helical air flow passage (45) having a helical axis parallel to the housing axis, said helical air flow passage providing a connection between the air outlet opening (26) and the air inlet opening (24) of the housing (21) and taking a course varying from a direct connection between the air outlet opening (26) and the air inlet opening (24), wherein the damping insert (27) is made from a plurality of disks (28) stacked on each other and each of said disks (28) has a disk axis and is provided with two passage segments (29,30), each of said two passage segments having a diameter equal to that of the other passage segments and being spaced a distance from the disk axis equal to that of the other passage segments, and each of the disks is rotated a predetermined rotation angle about the housing axis relative to an adjacent one of said disks.

2. A muffler for a fan as defined in claim 1, wherein the damping insert (27) is made form a sound absorbing material.

3. A muffler for a fan as defined in claim 1, wherein said housing (21) is made from plastic.

4. A muffler for a fan as defined in claim 1, wherein two of said helical air flow passages are provided in said damping insert and spaced from each other.

5. A muffler for a fan as defined in claim 1, wherein the predetermined rotation angle is 33°.

6. A muffler for a fan defined in claim 1, wherein the housing (21) comprises a housing pot (22) having a top opening and a funnel-like pot base (221), the housing pot (22) containing the damping insert (27), one of the air outlet opening and air inlet opening being located in a front end of the pot base (221); and a flat housing cover (23) closing the top opening of the housing pot (22), said housing cover (23) being provided with two throughgoing openings (33,34) congruent with the two passage segments (29,30) in the disk (28) of the damping insert closest to the housing cover.

7. A muffler for a fan, said muffler comprising a housing (21) having a housing axis, an air inlet opening (24) and an air outlet opening (26) connectable to an air intake side of a fan (15); and a damping insert (27) made from a sound absorbing material and having at least one helical air flow passage providing a connection between the air outlet opening (26) and the air inlet opening (24) of the housing (36) so that air can flow through the air inlet opening to the air outlet opening, wherein the housing comprises a housing pot having a top opening and a funnel-like pot base, and a flat housing cover at least partially closing the top opening of the housing pot, the air inlet opening being coaxial to the housing axis and provided in the funnel-like pot base and the air outlet opening comprising two throughgoing openings of approximately equal diameter provided in the housing cover spaced an equal distance from the housing axis.

8. A muffler for a fan as defined in claim 7, wherein the damping insert consists of a plurality of substantially equal disks stacked one on the other in the housing pot of the housing and each having two passage segments of equal diameter spaced an equal distance from the housing axis, each of said disks being rotated a predetermined angle relative to an adjacent one of the disks so that said passage segments form two helical passages through said damping inserts connecting the air outlet opening with the air inlet opening.

* * * * *